Feb. 20, 1940.                    D. HEYER                      2,191,200
                         VARIABLE SPEED POWER UNIT
                            Filed Oct. 9, 1933          2 Sheets-Sheet 1
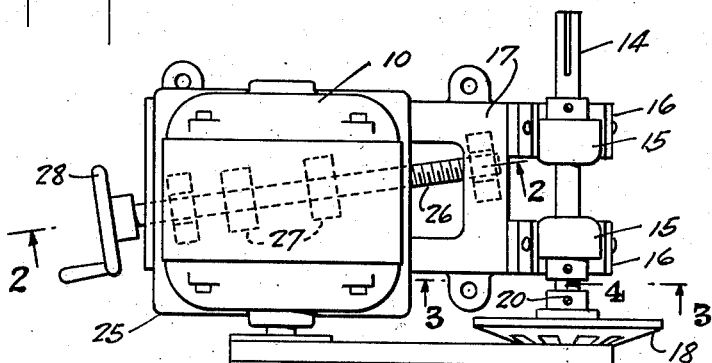
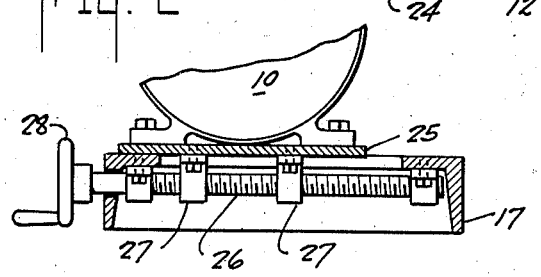
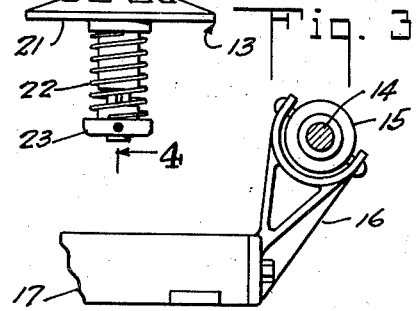
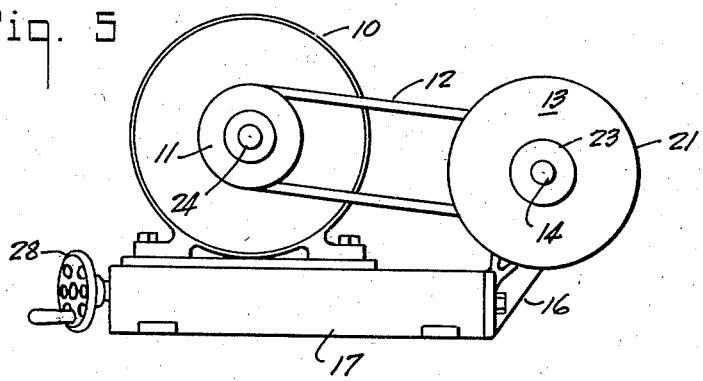
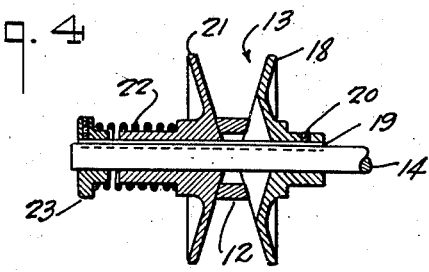
INVENTOR
Don Heyer
BY John Flam
ATTORNEY Feb. 20, 1940.  D. HEYER  2,191,200
VARIABLE SPEED POWER UNIT
Filed Oct. 9, 1933  2 Sheets-Sheet 2

INVENTOR
Don Heyer
BY John Flam
ATTORNEY

Patented Feb. 20, 1940

2,191,200

UNITED STATES PATENT OFFICE 2,191,200

VARIABLE SPEED POWER UNIT

Don Heyer, Los Angeles, Calif., assignor to U. S. Electrical Motors, Inc., a corporation of California Application October 9, 1933, Serial No. 692,851

13 Claims. (Cl. 74—230.17)

This invention relates to a power unit adapted to drive a load at a variable speed. More particularly, the invention relates to a unit of this character wherein the speed adjustment is effected by varying the effective diameter of either a driving or a driven pulley, or both.

Such power units are in general well-known. They may comprise one or more pulley structures, having variable effective diameters. The pulley structure is usually formed of a pair of relatively axially movable sections, having opposed inclined faces, arranged to contact with opposite sides of a flexible wedge-shaped belt. In this arrangement, the radial distance from the pulley axis to the belt is a function of the axial spacing of the inclined faces. Thus for a wide separation of the faces, the belt is allowed to move inwardly toward the axis and the effective diameter of the pulley is small. On the other hand, when the faces are closer together, the belt is farther from the axis, and the effective diameter is greater.

This application is a continuation in part of my copending application Serial No. 452,108, filed May 13, 1930, for Variable speed transmission device.

The form of the invention illustrated by Figs. 1 to 5 inclusive is specifically claimed in my copending divisional application, Serial No. 33,656, filed July 29, 1935, for Variable speed power unit. Other subject matter disclosed herein, but not claimed, is made the basis of my copending application, Serial No. 34,049, filed July 31, 1935, for Variable speed transmission device.

In transmitting power at variable speeds by the aid of such pulley structures, it has been common to adjust the axial spacing of the sections of one pulley, and to provide an arrangement for compensating for the corresponding variation in the belt length in contact with the pulley, as by correspondingly but oppositely varying the effective diameter of the other pulley in driving relation to the belt; or else by varying the center distance between the pulleys, or by any other belt tightening device.

It has been proposed especially, to accomplish this result by positive adjustment of both pulley diameters in reverse senses; thus if one pulley diameter is increased, the other pulley diameter is simultaneously decreased, by positive mechanical adjustment of the pulley sections. Such schemes, however, are apt to lead to complications. For example, the belt connecting the pulleys should be kept in alinement between them; that is, the length of the belt should be kept perpendicular to the pulley axes. This can be accomplished by positively and equally adjusting both sections of each pulley structure, whereby the axial position of the belt is kept at a definite place. Otherwise, the pulley section of one structure can be axially fixed, the other section only being adjustable; and correspondingly, that section of the other pulley structure is axially fixed which engages with that side of the belt opposite the side engaged by the other fixed section. In such mechanisms, the belt is kept in alinement but its axial position is varied, as it moves outwardly of one fixed pulley section, and moves inwardly of the other fixed pulley section.

However, in all such positive adjustments of both pulley structures, extra provisions must be made to compensate for two additional factors, which will now be discussed. The first factor to be considered is the variation in the desired belt length due to the varying included angle between the upper and lower reaches of the belt as the pulley diameters vary. The other factor is belt wear, which is unavoidable and which must be taken up to ensure proper driving relation at all times.

Since all of these factors lead to complications in the adjustment mechanism, it has been proposed to obviate these complications by positively adjusting only one of the pulley structures, and by utilizing for the other structure, a resilient force, such as centrifugal force, or a spring force, for urging the two pulley sections toward each other.

With an arrangement of this character, when the positively adjusted structure has its effective diameter increased, the belt at the other pulley structure wedges the resiliently urged pulley sections apart against the resilient force. Conversely, when the positively adjusted structure has its effective diameter decreased, the resultant belt slack at the other pulley structure is taken up by the relative movement of its sections caused by the resilient force urging the sections together. It is apparent that the resilient force also takes up any belt slack automatically, independent of the cause of such slack, such as belt stretch or wear, or inherent variations due to variations in the pulley diameters.

The present arrangement relates to an electric motor drive in which one of the pulley structures has pulley sections that are urged together by a resilient force. In motor drives of this character, the force of friction between the belt sides and the pulley faces, which prevents belt slip, must be great enough to take care of momentary or transient overloads as high as one hundred percent. For example, often the starting torque required from an electric motor is about twice the full load running torque. Accordingly, the spring or other device creating the resilient force holding the sections together must be so designed as to give ample margin for such overloads without causing a "pull out"; that is, belt slip at the driving pulley. The resultant bulky springs are obviously expensive and otherwise disadvantageous.

By the aid of the present invention, a variable speed electric motor drive is secured in which the device providing the resilient force urging the pulley structures toward each other, can be made of relatively small dimensions.

The arrangement whereby this advantage is obtained has been the result of observations and experiments upon variable speed transmissions. In such observations, the surprising fact was noted that a very great difference upon the "pull out" torque occurred when the resilient pulley adjustment was changed from the driving pulley to the driven pulley.

Thus one pulley structure having a positively fixed diameter, and another pulley structure having sections resiliently urged together, were used. In one set of observations, the positively fixed diameter pulley was made the driven pulley, and the resiliently adjustable pulley was made the driving pulley. Measurements were made of the "pull out" torques, for variations in transmission ratios. Then the same positively fixed diameter pulley was made the driving pulley, and the resiliently adjustable pulley was made the driven pulley. Similar measurements were made of the "pull out" torques for various transmission ratios. It was discovered that these latter "pull out" torques were of the order of twice the "pull out" torques when the positions of the pulleys were reversed.

This great increase in pullout torque is due to the effect of friction on the wedging or spreading action of the belt against the adjacent pulley faces. The radial force against the pulley faces, created by the belt tension, at any point, is at all times directly proportional to that tension.

The total axial force, which would act to separate the pulley faces were it not for the restraining action of the resilient force, is equal to the surface integral of the axial components of all forces acting against the pulley face. This total axial force determines the pullout; for if too great, the pulley sections separate.

When the member providing the resilient force is placed on the driving pulley, the radial force due to the belt tension is greatest at the point where the belt first enters the pulley. The axial component created by this radial force compresses the belt until all forces are in equilibrium. As the belt travels around with the pulley, the belt tension is gradually relieved. However, the axial force against the pulley face remains constant at the maximum value. The belt is unable to move radially to relieve this axial force although the radial force due to belt tension has been decreased because the force created by belt compression is within the cone of friction and prevents any radial movement between the belt and the pulley.

The total axial force acting against the resilient member is then equal to the product of contact area and the maximum axial pressure.

When the member providing the resilient force is placed on the driven pulley, the radial force due to the belt tension is a minimum at the point where the belt enters the pulley. The axial force produced by the belt compression is then also a minimum. As the belt travels around with the pulley, the belt tension increases toward its maximum. However, the resultant axial force due to belt compression is equal to the difference of the axial components produced by the belt tension and by the frictional force between the belt and the pulley face.

It is thus clearly evident that for equal values of the restraining resilient force the useful belt tension and pullout torque will be much greater when this restraining member is placed on the driven pulley.

Accordingly it is one of the objects of this invention to provide an electric motor drive having a variable speed and in which the "pullout" characteristic is improved by appropriate design of the variable pulley structure mechanisms.

It is another object of the invention to accomplish this result in a simple and inexpensive manner, and especially by placing that adjustable pulley structure which has pulley sections resiliently urged together, upon the driven shaft.

This invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of the invention; but it is to be understood that this detailed description is not to be taken in a limiting sense, since the scope of the invention is best defined by the appended claims.

Figure 1 is a plan view of a power unit incorporating the invention;

Fig. 2 is a detail sectional view taken along plane 2—2 of Fig. 1;

Fig. 3 is a detail sectional view taken along plane 3—3 of Fig. 1;

Fig. 4 is a detail sectional view taken along plane 4—4 of Fig. 1;

Fig. 5 is a side elevation of the device shown in Fig. 1;

Figure 6:
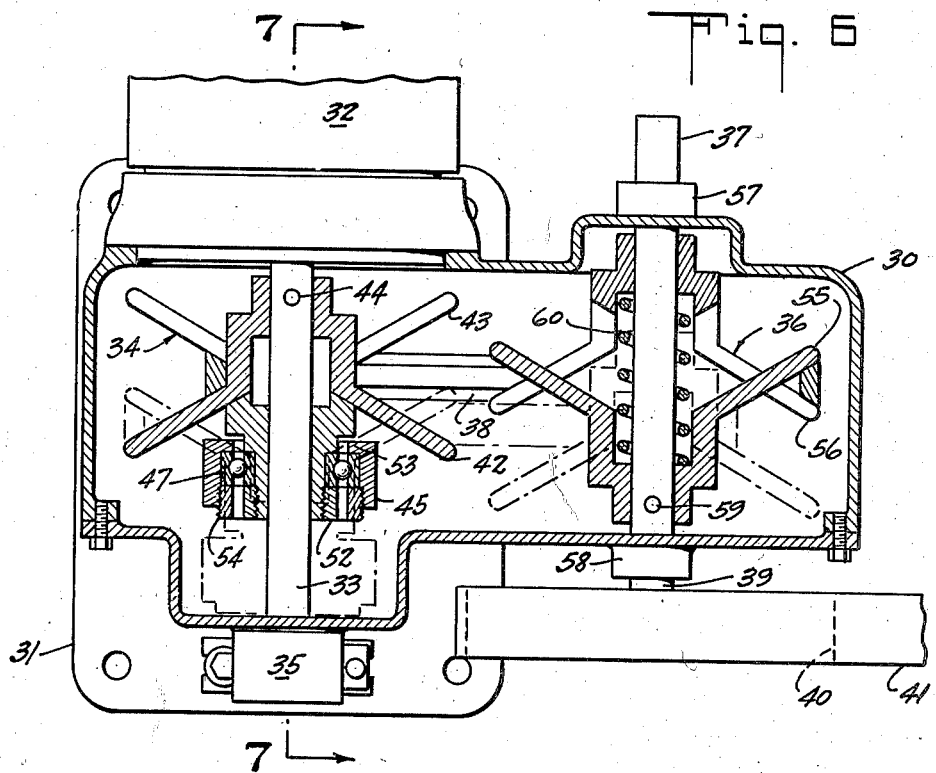
Fig. 6 is a horizontal sectional view of another modification of the invention.

Referring more particularly to the form of the invention disclosed in Figs. 1 to 5, inclusive, the motor 10 has a fixed diameter pulley 11. This pulley is connected as by the aid of a flexible V-belt 12 with an adjustable pulley structure 13. The driven shaft 14 is appropriately journalled in the bearing supports 15 shown in this instance as swivelled upon the standards 16. Standards 16 are fastened to one side of a supporting base 17.

One pulley section, such as 18, is axially fixed on shaft 14 as by the aid of a key 19 and set screw 20. The other section 21 is axially movable but is splined on shaft 14 as by the aid of the key 19. It is resiliently urged at all times toward section 18 as by the aid of a compression spring 22. This compression spring encompasses the hub of section 21 and abuts a shoulder on the hub. The other end of the spring abuts an axially fixed collar 23 which is fastened to this shaft 14.

The speed variation is accomplished by varying the center distance between the armature shaft 24 and driven shaft 14. For example, the motor 10 can be supported on a base 25 which is slidable on the main supporting base 17. The center distance between the motor shaft and shaft 14 can then be adjusted by the aid of any appropriate mechanism, such as the lead screw 26. This lead screw passes through appropriate threaded collars 27 fastened to the bottom of the base 25. The lead screw 26 can be appropriately manipulated as by hand wheel 28.

It is noted that the axis of the lead screw 26 is inclined to a plane perpendicular to the axes of the driven and driving shafts. This inclination is such that as the center distances decrease, the fixed pulley 11 stays in alinement with the adjustable pulley structure 13, by moving the motor structure upwardly. Without such an inclination, the belt 12, riding up on the inclined face of the axially fixed section 18, would slope between the two pulley structures.

The angle of inclination of the axis of lead screw 26 depends upon the angle which the pulley face makes with a plane perpendicular to the axes of the shafts, as well as upon the angle included between the two reaches of the belt 12. In general it may be stated that where the two reaches of the belt are substantially parallel for the whole range of movement, the tangent of the angle which the axis of lead screw 26 makes with the perpendicular plane is 0.640 times the tangent of the angle which the pulley faces make to the perpendicular plane.

In this case, a resilient force is used to vary the effective diameter of the driven pulley structure, the drive pulley structure having a positively fixed pulley diameter.

Figure 7:
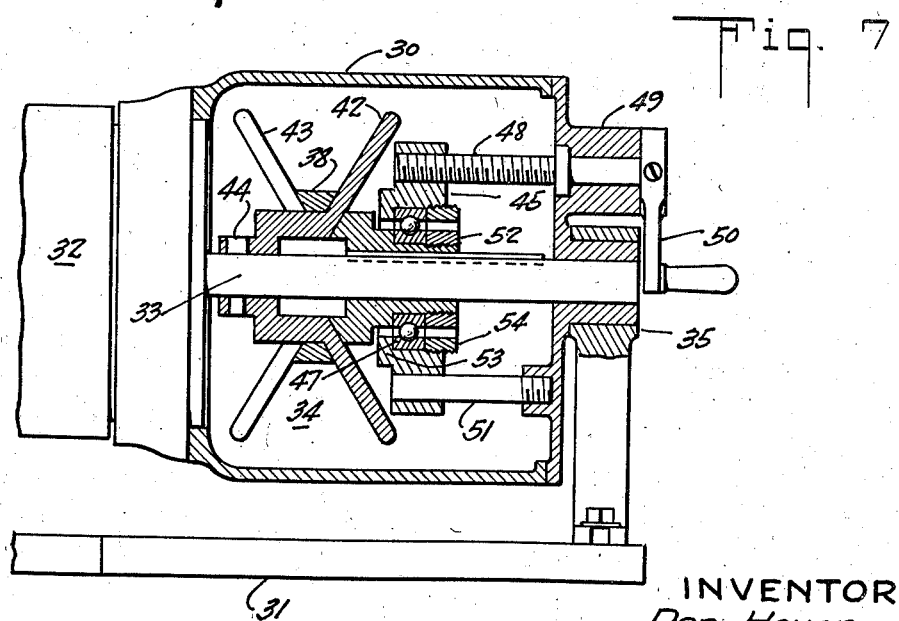
Fig. 7 is a vertical section taken along plane 7—7 of Fig. 6.

Another form of the invention is shown in Figs. 6 and 7, the variable speed transmission mechanism being shown as enclosed within a casing 30. This casing is provided with a base 31, whereby it may be fastened to an appropriate base or support. Projecting from and supported on one end of the casing 30 is an electric motor 32, having a frame, the end of which is appropriately fastened into one wall of casing 30. This motor may have the usual stator structure and rotor structure. The rotor structure is mounted on a shaft 33. This shaft 33 extends into the casing 30 and carries a pulley structure 34, the effective diameter of which can be varied in a manner to be hereinafter described. The outer end of shaft 33 may be supported in a suitable bearing 35.

The pulley structure 34 thus forms a driving pulley serving to drive a driven pulley structure 36, mounted on a driven shaft 37.

Each pulley structure 34 and 36 comprises a pair of spider like sections having interlacing fingers which form in effect a grooved pulley adapted to receive a wedge, or V-shaped belt 38. The driven shaft 37 extends through the walls of casing 30 to provide an extension 39 which may be coupled to the load in any desired manner as by a pulley 40 carrying a belt 41.

The pulley structure 34, which is in driving relation with shaft 33, comprises a pair of relatively axially movable sections 42 and 43. These sections have opposed inclined faces, as previously mentioned, engaging the opposite sides of the flexible belt 38. For the position shown, the effective diameter of pulley structure 34 is substantially at a minimum, the opposed inclined faces being separated by substantially the maximum permissible amount.

In the present instance, one of the pulley sections such as 42, is fixed against relative axial movement with respect to shaft 33, as by the aid of a set screw 44 passing through the hub of section 42 and engaging the shaft 33. The other section 43, however, is slidable on shaft 33 and is positively adjusted by an appropriate mechanism to be hereinafter described in detail.

On the other hand, the adjustable pulley structure 36 on the driven shaft 37 is arranged to be automatically adjusted by a resilient mechanism so as to keep the belt tight at all times. In this way the objects of the invention are attained, the driving pulley structure 34 having a positive adjustment for varying the effective pulley diameter, while the driven pulley structure 36 is adjusted by a resilient mechanism automatically acting to vary the pulley diameter to take up all belt slack.

One manner in which the section 43 can be positively adjusted is disclosed in Fig. 7, although other equivalent schemes could be used.

The means for adjusting the variable pulley structure 34 may comprise a collar 45 engaging with the hub portion of the movable section 43 through a bearing 47 to receive in its uppermost portion a screw 48 one end of which may be journalled in a bearing 49 formed in one wall of casing 30 and extend therethrough to receive any suitable actuating member as a crank 50. The movable section 43 may be slidably splined to the shaft 33 as clearly shown in Figure 7 of the drawings. The lower portion of the collar 45 may be adapted to slidably receive a supporting pin 51 secured in the wall of the casing 30. The bearing 47 may be held in engagement with the hub portion by means of a nut 52 while a flange 53 on the collar 45 and a nut 54 provides suitable means for securing said collar to the bearing.

The variable unit 36 comprises two sections 55 and 56 similar to sections 42 and 43 mounted on shaft 37, which may be journalled in bearings 57 and 58. The section 55 may be secured to the shaft by a taper pin 59 or the like while spider 56 may be allowed to float thereon. A compression spring 60 may yieldingly engage with the two spider-like sections as shown in Figure 6. A flexible element 38 such as a V-belt may serve to engage with the variable units 34 and 36.

In Figure 6 of the drawings I have shown the variable unit 34 in a position where the diameter of the belt seat is at a minimum while that of the variable unit 36 is at a maximum. The dotted lines in this same view indicate the exact reversal of the foregoing condition, that is, the diameter of the variable unit 34 is at a maximum and that of the unit 36 at a minimum. It should be particularly noted that the belt remains constantly in line as various speed changes are maintained.

When my transmission mechanism is in operation and it is desired to vary the speed of the driven mechanism, my device may be actuated in the following manner. By turning the crank 50, the movable section 43 may be moved outwardly to angularly raise the belt in the V-shaped seat, the diameter of which accordingly becomes increased. As the diameter of the belt seat is increased on the variable unit 43 it may be readily seen that the other movable section 56 is forced inwardly by the belt to define a smaller seat diameter and throw the spring 60 under additional compression. A constant series of speed changes may be accomplished in the foregoing manner until a position indicated by dotted lines in Figure 6 is reached. When the crank is turned in the opposite direction and the movable section 43 is moved inwardly the diameter of the belt seat is decreased and the compression spring proceeds to force the movable section 56 outwardly to increase the diameter of the belt seat and compensate for the slackness appearing in the belt 38.

I claim:

1. A speed varying motor unit comprising a base, an electric motor mounted on said base and having a shaft, a friction cone secured to and axially fixed upon said shaft, a companion friction cone facing the first-mentioned cone and splined upon said shaft, a driven shaft journaled in suitable supports carried by the base, a friction cone secured to and axially fixed upon said driven shaft and faced in a direction opposite to the direction of facing of the first-mentioned friction cone and axially offset relative thereto, a companion friction cone splined upon the driven shaft and facing the cone secured to said shaft, a spring yieldingly urging said last-mentioned cone toward its fellow, an edge-active belt embracing and frictionally engaging said friction cones, and means independent of belt pressure and shaft rotation for positively and accurately shifting said second-mentioned cone axially in either direction, said means comprising a manipulating element anchored on the base and means between said manipulating element and said cone adapted to positively shift said cone axially during rotation and hold the same in adjusted position independent of rotation of the cone.

2. A speed varying transmission unit comprising a shaft, a friction cone secured to and axially fixed upon said shaft, a companion friction cone facing the first-mentioned cone and splined upon said shaft, a spring urging said companion cone toward the first cone, a second shaft journaled in suitable supports in parallelism with the first shaft, a friction cone secured to and axially fixed upon said second shaft and faced in a direction opposite to the direction of facing of the first-mentioned friction cone, a companion friction cone splined upon the second shaft and facing the cone secured to said shaft, said fixed cones being so positioned upon their respective shafts that, when the shiftable cone of each pair is in its medial position, the medial transverse planes between each cone pair are coincident, an edge-active belt embracing and frictionally engaging said friction cones, and means independent of belt pressure and shaft rotation for positively and accurately shifting said last-mentioned splined cone axially of the second shaft in either direction, said means comprising a manipulating element anchored on the base and means between said manipulating element and said cone adapted to positively shift said cone axially during rotation and hold the same in adjusted position independent of rotation of the cone.

3. A speed varying transmission unit comprising a power delivery shaft, a pair of friction cones mounted thereon to rotate therewith, one axially fixed upon the shaft and the other splined thereon, a spring yieldingly urging said splined cone toward its fellow, a power receiving shaft associated with the power delivery shaft and parallel thereto, a pair of friction cones mounted on said power receiving shaft, one fixed to said shaft to rotate therewith and the other splined thereon, the two axially fixed cones being offset relative to each other in such a position that the medial plane of the cone pairs, when said cone pairs are in their medial positions, will be coincident, and means for positively axially shifting in either direction, the shiftable cone carried by the power receiving shaft, said means comprising a manipulating element anchored on the base and means between said manipulating element and said last mentioned splined cone adapted to positively shift said cone axially during rotation and hold the same in adjusted position independent of rotation of the cone.

4. In a variable speed power unit, an electric motor having a shaft, a driving pulley structure having a positively determined effective diameter and mounted on said shaft, a driven shaft having an axis parallel to the motor shaft, a driven pulley structure mounted on said driven shaft, a flexible wedge-shaped belt connecting said pulley structures, said driven pulley structure including a pair of relatively axially movable sections having opposed inclined faces, forming variable effective pulley diameters in accordance with the variations in the relative axial positions of the pulley sections, means active during operation of the unit, for continuously exerting a force for urging said pulley sections toward each other and into driving relation with said belt, a common base for supporting the motor, the driven shaft and the driven pulley, and means for varying the speed ratio and for maintaining the belt in alignment between the pulley structures, comprising positive adjusting means acting on the driving pulley structure to adjust the position of the belt with respect to the driven pulley structure, and having a normally stationary manipulating element supported on said common base for operating said positive adjusting means.

5. In a variable speed power transmission, a driving shaft and a driven shaft, a pair of adjustable pulley structures in respective axial driving relation to each of said shafts, each of said pulley structures including a pair of pulley sections having opposed inclined faces, forming by relative axial adjustment variable effective pulley diameters, a flexible power transmitting member actively engaging said pulley structures, means for holding one pulley section of each of said pulley structures in fixed axial position, said axially fixed pulley sections being oppositely faced, means for positively adjusting the axial position of the other pulley section of one of said pulley structures in either direction to positively adjust the effective diameter of the pulley structure, said positively adjusting means including, an axially adjustable member restrained against axial movement with respect to the adjusted pulley section, whereby an axial movement of the axially adjustable member in either direction results in a positive and like movement of the pulley section, and means for positively adjusting the position of said axially adjustable member in either direction and for holding said axially adjustable member in the adjusted position, and means for resiliently adjusting the effective diameter of the other of said pulley structures in response to the adjustment of said positively adjusted pulley structure.

6. In an adjustable speed drive, a driving shaft, a driving pulley structure in coaxial driving relation to said driving shaft, a driven shaft, a driven pulley structure in coaxial driving relation to said driven shaft, a flexible power transmitting member actively engaging said pulley structures, each of said pulley structures including a pair of pulley sections having opposed inclined faces, forming by relative axial adjustment variable effective pulley diameters, means for securing one pulley section of each of said pulley structures in fixed axial position with respect to its respective shaft, said axially fixed pulley sections being oppositely faced and axially displaced to maintain the belt in substantial alignment, means for positively adjusting the axial position of the other pulley section of said driving pulley structure in either direction to positively adjust the effective diameter of the driving pulley structure, said positively adjusting means including, an axially adjustable member restrained against axial movement with respect to the adjusted pulley section, whereby an axial movement of the axially adjustable member in either direction results in a positive and like movement of the pulley section, and means for positively adjusting the position of said axially adjustable member in either direction and for holding said axially adjustable member in the adjusted position, and means for resiliently urging the other pulley section of said driven pulley structure toward the axially fixed pulley section, whereby the effective diameter of the driven pulley structure is resiliently adjusted in response to the adjustment of the driving pulley structure.

7. In a variable speed power transmission, a driving shaft and a driven shaft, a pair of adjustable pulley structures in respective axial driving relation to each of said shafts, each of said pulley structures including a pair of pulley sections having opposed inclined faces forming by relative axial adjustment variable effective pulley diameters, a flexible power transmitting member actively engaging said pulley structures, means for securing one pulley section of each of said pulley structures in fixed axial position with respect to its supporting shaft, said axially fixed pulley section being oppositely faced and axially displaced to maintain the belt in substantial alignment, means for positively adjusting the axial position of the other pulley section of one of said pulley structures in either direction to positively adjust the effective diameter of the pulley structure, said positively adjusting means including, an axially adjustable member restrained against axial movement with respect to the adjusted pulley section, whereby an axial movement of the axially adjustable member in either direction results in a positive and like movement of the pulley section, and means for positively adjusting the position of said axially adjustable member in either direction and for holding said axially adjustable member in the adjusted position, means for resiliently adjusting the effective diameter of the other of said pulley structures in accordance with the adjustment of the positively adjusted pulley structure, and supplementary means for varying the axial position of one of said axially fixed pulley sections, said supplementary means providing means for adjusting the relative axial position of the driving and driven pulley structures to bring the belt into accurate alignment and for adjusting said pulley structures to acommodate belts of various widths.

8. In a variable speed drive, a driving shaft, a driving pulley structure in coaxial driving relation to said driving shaft, a driven shaft, a driven pulley structure in coaxial driving relation to said driven shaft, a flexible power transmitting member actively engaging said pulley structures, each of said pulley structures including a pair of pulley sections having opposed inclined faces, forming by relative axial adjustment variable effective pulley diameters, means for securing one pulley section of each of said pulley structures in fixed axial position with respect to its respective shaft, said axially fixed pulley sections being oppositely faced and axially displaced so that the belt is maintained in substantial alignment for all values of the speed ratio of the adjustable speed drive and whereby the belt is in perfect alignment for an intermediate value of the speed ratio, means for positively adjusting the axial position of the other pulley section of one of said pulley structures in either direction to positively adjust the effective diameter of the pulley structure, said positively adjusting means including, an axially adjustable member restrained against axial movement with respect to the adjusted pulley section, whereby an axial movement of the axially adjustable member in either direction results in a positive and like movement of the pulley section, and means for positively adjusting the position of said axially adjustable member in either direction and for holding said axially adjustable member in the adjusted position, and means for resiliently adjusting the effective diameter of the other of said pulley structures in response to the adjustment of said positively adjusted pulley structure.

9. In a variable speed power transmission, a shaft, an adjustable pulley structure in axial driving relation to said shaft, said adjustable pulley structure including a pair of pulley sections having opposed inclined belt engaging faces, forming by relative axial adjustment variable effective pulley diameters, means for securing one of said pulley sections in fixed axial position with respect to said shaft, a hub provided for the other of said pulley sections, an antifrictional bearing having a pair of relatively rotatable races, means for securing one of said races to said hub, an axially adjustable member, means for securing the other of said races to said axially adjustable member, means for preventing the rotation of said axially adjustable member, a lead screw threadedly engaging said axially adjustable member, and means for rotatably supporting said lead screw in fixed axial position, whereby a rotation of said lead screw produces a corresponding axial movement of said axially adjustable member and the pulley section associated therewith.

10. In an adjustable pulley structure having two pulley sections with opposed inclined belt engaging faces forming by relative axial adjustment variable effective pulley diameters, a shaft in axial driving relation to said pulley sections, means for securing one of said pulley sections in fixed axial position with respect to said shaft, and means for adjusting the axial position of the other of said pulley sections, said last mentioned means including a hub, a projecting portion provided for said hub, said projecting portion being extended through said axially fixed section and being secured to said axially adjustable section, a bearing structure axially fixed to said hub, and an axially adjustable means for adjusting the axial position of said bearing structure.

11. In an adjustable pulley structure, a pair of pulley sections having opposed inclined belt engaging faces forming by relative axial adjustment variable effective pulley diameters, a belt engaging said pulley sections, a pair of hubs, an extending portion provided for each of said hubs, each of said extending portions being respectively projected through the adjacent pulley section and being secured to the remote pulley section so as to project axially from the face thereof, and a compression spring interposed between said hubs whereby said pulley sections are maintained in active driving relation to said belt.

12. In an adjustable speed power transmission, a driving shaft and a driven shaft, a pair of adjustable pulley structures in respective axial driving relation to each of said shafts, each of said pulley structures including a pair of pulley sections having opposed inclined belt engaging faces, forming by relative axial adjustment variable effective pulley diameters, a belt actively engaging said pulley structures, means for securing one pulley section of each of said pulley structures in fixed axial position to its respective shaft, said axially fixed pulley sections being oppositely faced and axially displaced to maintain the belt in substantial alignment, means for positively adjusting the effective diameter of one of said pulley structures in either direction, means for resiliently adjusting the diameter of the other of said pulley structures in response to the adjustment of said positively adjusted pulley structure, a casing enclosing said pulley structures and providing means for rotatably supporting said shafts, an electric motor in driving relation to said driving shaft, and means for securing said electric motor to the wall of said casing adjacent to said driving shaft.

13. In an adjustable speed power transmission, a driving pulley structure, a driven pulley structure, a belt for transmitting power between said pulley structures, each of said pulley structures having a pair of pulley sections with opposed inclined faces, forming by relative axial adjustment variable effective pulley diameters, means for yieldingly urging the pulley sections of said driven pulley structure toward each other and into driving relation with said belt, and means for positively adjusting the relative axial position of the pulley sections of said driving pulley structure in either direction to adjust the effective pulley diameter and to maintain the belt in substantial alignment, comprising a bearing structure secured to one of the driving pulley sections and means for positively adjusting the axial position of said bearing structure in either direction and for holding said bearing structure in the adjusted position.

DON HEYER.